United States Patent [19]

Jonas et al.

[11] E Patent Number: Re. 33,223

[45] Reissued Date of Patent: May 29, 1990

[54] ORGANIC POLYMERS CONTAINING TCNQ COMPLEXES AND STABILIZED AGAINST THE EMISSION OF HCN

[75] Inventors: Friedrich Jonas, Aachen; Jurgen Hocker, Bergisch Gladbach, both of Fed. Rep. of Germany

[73] Assignee: Bayer Aktiengesellschaft, Leverkusen, Fed. Rep. of Germany

[21] Appl. No.: 144,801

[22] Filed: Jan. 15, 1988

Related U.S. Patent Documents

Reissue of:

[64] Patent No.: 4,568,485
Issued: Feb. 4, 1986
Appl. No.: 651,625
Filed: Sep. 17, 1984

[30] Foreign Application Priority Data

Sep. 13, 1983 [DE] Fed. Rep. of Germany ..... 3335513

[51] Int. Cl.[5] ..... H01B 1/06

[52] U.S. Cl. ..... 252/518; 252/580; 252/519; 524/204; 524/327; 524/328; 524/363; 524/394; 524/396; 524/401; 524/403; 524/413; 524/417; 524/423; 524/429; 524/911; 524/912; 524/913; 260/DIG. 21; 428/411.1

[58] Field of Search ..... 252/500, 518, 519, 512, 252/514, 513; 428/423.1, 425.9, 500, 522, 411.1, 474.4; 260/DIG. 21, DIG. 16; 524/401, 80, 204, 236, 327, 328, 363, 394, 396, 403, 413, 417, 911, 423, 912, 429, 913

[56] References Cited

U.S. PATENT DOCUMENTS

| | | | |
|---|---|---|---|
| 3,424,698 | 1/1969 | Lupinski et al. | 252/500 |
| 4,293,452 | 10/1981 | Fox et al. | 252/518 |
| 4,374,048 | 2/1983 | Kim et al. | 252/518 |

FOREIGN PATENT DOCUMENTS 1067260 5/1967 United Kingdom .

*Primary Examiner*—Josephine Barr
*Attorney, Agent, or Firm*—Connolly and Hutz

[57] ABSTRACT

The invention relates to plastics materials of high electrical conductivity containing TCNQ complexes and stabilized against the emission of HCN and to mouldings, films and coatings of such materials, as well as to the use of the plastics material for the production of antistatic foils and coatings onto substrate.

6 Claims, No Drawings

ORGANIC POLYMERS CONTAINING TCNQ COMPLEXES AND STABILIZED AGAINST THE EMISSION OF HCN

Matter enclosed in heavy brackets [ ] appears in the original patent but forms no part of this reissue specification; matter printed in italics indicates the additions made by reissue.

This invention relates to plastics materials of high electrical conductivity containing TCNQ-complexes and stabilised against the emission of HCN and to moldings, films and coatings of such materials.

Plastics materials generally synthetic thermoplastic polymers, are usually good electrical insulators having specific electrical conductivities below $10^{-14}$ $(ohm \times cm)^{-1}$. Accordingly, plastics materials are capable of developing strong electrostatic charges, which it is imperative to avoid for many applications. This applies in particular in cases where explosive gas or dust-gas mixtures can be ignited by spark discharge.

A large number of antistatic additives have been developed for the antistatic finishing of plastics. These additives are applied, for example, to the surface of plastic articles. In general, however, they lose their effectiveness after a short time. Antistatic additives have also been incorporated in plastics. In many cases, this has an adverse effect upon the properties of the plastic or, alternatively, the additives diffuse out. The antistatic additives make the plastic surface hydrophilic to a certain extent so that a film of water dependent on the humidity in the atmosphere is able to form over the surface, preventing charging.

To make plastics antistatic requires at the very least a specific conductivity of $10^{-11}$ to $10^{-10}$ $(ohm \times cm)^{-1}$ or a surface resistance of at most $10^9$ to $10^{10}$ ohms.

There are numerous applications for electrically conductive plastics in electrical engineering and electronics. For example, synthetic materials capable of screening off electromagnetic fields are being used to an increasing extent. In addition, conductive polymers are being used as active and passive system components. In this case, the application is of course determined by the conductivity obtained, in this connection, it is important that the other properties of the plastic should not be adversely affected.

To make plastics electrically conductive, attempts have been made to incorporate inorganic, electrically conductive substances, for example metals, metal oxides, metal sulphides, carbon black or graphite. However, additives such as these show very poor compatibility with the organic polymers. In order to obtain conductivity levels of practical value, such large quantities (generally 10 to 30% by weight, based on the plastic) have to be used that the mechanical properties are seriously impaired. Plastics can also be made electrically conductive by the addition of charge-transfer complexes (CT-complexes). Crystalline CT-complexes are among the best organic conductors. Crystals of certain CT-complexes even show metallic conductivity. Organic complex salts based on 7,7,8,8-tetracyanoquinodimethane, hereinafter referred to as TCNQ, are CT-complexes of particularly good conductivity.

The electrical conductivity of plastics can be increased, in some cases considerably, by the addition of CT-complexes. In this case, the conductivity level obtained depends upon the concentration and crystal form of the CT-complex incorporated in the polymer. To obtain high conductivity levels extending into the semiconducting range ($10^{-6}$to $10^{-3}$$(ohm \times cm)^1$, it is necessary to use in some cases considerable quantities of CT-complexes amounting to between 8 and 20% by weight, based on the plastic.

Plastics can also be antistatically finished by the addition of solutions of TCNQ-complexes in suitable solvents (cf. for example DOS 31 31 251). In this case, considerably smaller quantities, for example 1 to 2% are sufficient.

TCNQ-complexes suitable for the antistatic finishing of plastics are known per se. Their composition may be described by the following formula $$D.(TCNQ)_n$$

in which D represents an electron donor and n is a number of from 1 to 5, preferably 2.

A synopsis can be found in J. Am. Chem. Soc. 84, 3374–3387 (1962).

According to the invention, it is preferred to use those CT-complexes of which the donor portion emanates from an organic compound containing nitrogen and/or oxygen and/or sulphur and is present in the form of a cation. Examples of CT-complexes such as these are the cations of the following compounds and the corresponding quaternary ammonium ions obtained by alkylation: triethylamine, diethylcyclohexylamine, quinoline, benzo-2,3 quinoline, o-phenanthroline, benzthiazole, N-methylbenzimidazole, pyridine, 2,2'-dipyridine, 4,4'-dipyridine, 4,5-dimethylthiazoline, 1-phenylimidazolidine, bis-[1,3-diphenyl-imidazolidinyl-(2)-idene], bis-[(3-methylbenzthiazolinyl-(2)-idene] and isoquinoline.

In principle, any plastics may be antistatically finished with TCNQ complexes. Examples of plastics which may be thus finished are polyolefins, such as polyethylene, polystyrene, polyisoprene, polyvinylchloride, polyamides, such as polyamide-6,6, polyesters, such as polyethylene terephthalate, polycarbonates, polyacrylonitrile, acrylonitrile-butadiene-styrene copolymers (ABS), polvinyl acetate, cellulose esters, such as cellulose acetate and polyurethanes.

One disadvantage common to all polymers containing TCNQ-complexes lies in the significant emission of HCN over a period of time which, in extreme cases, can be detected by the odour of hydrocyanic acid.

On account of the toxicity of hydrocyanic acid, plastics finished with TCNQ-complexes have hitherto been unsuitable for many practical applications.

The present invention relates to the stabilisation of plastics finished with TCNQ-complexes against the emission of HCN by the addition of preferably from 0.005 to 5 moles per mole of TCNQ-complex of a salt or complex salt, preferably of Ni(II), Cu(II), Cu(I), Zn(II), Pd(II), Ag(I), Cd(II), Pt(II), Au(III) or Hg(II), preferably with organic sulfonic acids or carboxylic acids, such as acetic acid, 2-ethylhexanoic acid, stearic acid, benzoic acid, or inorganic acids, such as hydrofluoric acid, hydrochloric acid, hydrobromic acid, hydriodic acid, perchloric acid, nitric acid, sulphuric acid or phosphoric acid, and corresponding complex salts with organic and/or inorganic ligands.

Particular preference is attributed to copper-(II) and nickel salts or complex salts, for example nickel salts of organic carboxylic acids such as:

nickel acetate, nickel-2-ethylhexanoate, nickel stearate or nickel benzoate;

nickel complexes of organic 1,3-dicarbonyl compounds, such as nickel acetylacetonate;

nickel salts of inorganic acids, such as nickel bromide, nickel perchlorate or nickel fluoride;

copper salts of organic carboxylic acids such as copper acetate, copper-2-ethylhexanoate, copper stearate or copper benzoate;

copper complexes of organic 1,3-dicarbonyl compounds, such as copper acetyl acetonate or copper acetoacetate;

copper salts of inorganic acids, such as copper bromide, copper chloride or copper perchlorate;

copper complexes of aminocarboxylic acids, such as copper salicylate or disodium-copper ethylene diamine tetraacetate.

The salts or metal complex salts may be added to the plastics in a quantity of from 0.005 to 5 moles, preferably in a quantity of from 0.05 to 1 mole and, more preferably, in a quantity of from 0.1 to 0.5 mole per mole of the TCNQ-complex added.

The salts or metal complex salts may be incorporated in the polymers either in solid form or from solution.

Where the plastics materials are processed from solution, a solution of a TCNQ-complex or a finely disperse TCNQ-complex and a solution of the stabilising salt or the salt in solid form may be homogeneously mixed with a solution of the plastic and the resulting mixture further processed. For example, antistatically finished films may be produced from mixtures such as these by casting.

Where the plastics are processed from the melt, for example by extrusion, the TCNQ-complexes and the stabilising salts, such as standard additives, are incorporated during the processing of thermoplasts.

The mixtures according to the invention are also very suitable for the production of antistatic coatings onto non-conductive substrates, e.g., glass, organic polymers like polyvinyl chloride.

EXAMPLES

HCN Determination:

Quantities of 20 g of film according to Examples 1 to 9 were hermetically sealed form 7 days in 4 glass vessels. The quantity of HCN formed was then determined in ppm (detection limit 1 ppm).

EXAMPLE 1

A solution of 0.2 of N-methyl quinolinium[61] $(TCNQ)_2\ominus$ in 2 ml DMF and 8 ml of acetonitrile is added with stirring to 200 g of a 10% solution of a commercially available polycarbonate (for example Makrolon ®5900, a product of Bayer AG, Leverkusen) in methylene chloride. The solution is cast to form a film (dry film thickness 100 μm), and the quantity of HCN given off after 7 days is determined by the method described above.

The procedure in Examples 2 to 9 was the same as in Example 1, except that, before the film was cast, a solution of the particular stabiliser in the solvent indicated was stirred into the casting solution.

The stabilisers used and the HCN-values obtained are shown in Table 1.

TABLE 1

| Example No. | Stabiliser (g) | ml | Solvent | HCN (ppm) | R |
|---|---|---|---|---|---|
| 1 | — | — | — | 30 | $2 \cdot 10^7$ |
| 2 | 0.2 Cu $(acac)_2$ | 10 | dichloromethane | 0 | $3 \cdot 10^8$ |
| 3 | 0.2 Cu $(acetoacetate)_2$ | 10 | dichloromethane | 0 | $2 \cdot 10^{10}$ |
| 4 | 0.2 Cu $(CH_3COO)_2$ | 10 | acetonitrile | 0 | $1 \cdot 10^7$ |
| 5 | 0.2 Zn $(acac)_2$ | 10 | dichloromethane | 2 | $6 \cdot 10^7$ |
| 6 | 0.2 Ni $(acac)_2$ | 10 | dichloromethane | 0 | $9 \cdot 10^7$ |
| 7 | 0.1 Cu $(acac)_2$ | 10 | dichloromethane | 0 | $7 \cdot 10^7$ |
| 8 | 0.1 Ni $(acac)_2$ | 10 | dichloromethane | 0 | $6 \cdot 10^7$ |
| 9 | 0.1 Cu $(C_{17}H_{35}—COO)_2$ | 10 | Chloroform | 0 | $8 \cdot 10^7$ |

acac = acetylacetonate residue
R = surface resistance in Ω · cm according to DIN 53 483

EXAMPLE 10

16.3 g of N-methyl quinolinium iodide are dissolved in 300 ml of methylene chloride in a stirrer-equipped apparatus with Soxhlet attachment. 16.3 g of TCNQ are introduced into the Soxhlet attachment, being continiously extracted under reflux. The reaction is over when all the TCNQ has been dissolved out. The complex precipitate is filtered off under suction, washed with methylene chloride and dried.

EXAMPLE 11

200 g of a 10% polycarbonate solution in methylene chloride are added to 0.2 g of the TCNQ-complex of Example 10, followed by stirring until a homogeneous mixture is obtained. The solution is cast to form a film (dry film thickness ~ 100 μm) and the quantity of HCN given off after 7 days is determined.

The procedure in Examples 13 to 16 (Table 2) was the same as in Example 11, except that, before the film was cast, a solution of the particular stabiliser in the solvent indicated was stirred into the casting solution.

TABLE 2

| Example No. | Stabiliser (g) | ml | Solvent | HCN (ppm) | R |
|---|---|---|---|---|---|
| 11 | — | — | — | 10 | $10^7$ |
| 12 | 0.05 Cu $(acac)_2$ | 10 | dichloromethane | 0 | $2 \cdot 10^7$ |
| 13 | 0.2 Cu $(acetoacetate)_2$ | 10 | dichloromethane | 0 | $5 \cdot 10^9$ |
| 14 | 0.2 Cu $(CH_3COO)_2$ | 10 | acetonitrile | 0 | $2 \cdot 10^7$ |
| 15 | 0.1 Ni $(acac)_2$ | 10 | dichloromethane | 0 | $6 \cdot 10^7$ |
| 16 | 0.2 Cu $(C_{17}H_{35}COO)_2$ | 10 | chloroform | 0 | $3 \cdot 10^8$ |

acac = acetylacetonate residue
R = surface resistance in Ω · cm according to DIN 53 483

Table 3 relates to the use of other TCNQ-complexes. As in Example 2, quantities of 0.2 g of TCNQ-complexes corresponding to formulae I-IV were used.

TABLE 3

| Example No. | TCNQ-complex | Stabiliser (g) | ml | Solvent | HCN ppm |
|---|---|---|---|---|---|
| 17 | I | 0.2 $Cu(acac)_2$ | 10 | dichloromethane | 0 |

TABLE 3-continued

| Example No. | TCNQ-complex | Stabiliser (g) | ml | Solvent | HCN ppm |
|---|---|---|---|---|---|
| 18 | I | 0.1 $Ni(acac)_2$ | 10 | dichloromethane | 0 |
| 19 | II | 0.2 $Cu(acac)_2$ | 10 | dichloromethane | 0 |
| 20 | II | 0.1 $Ni(acac)_2$ | 10 | dichloromethane | 0 |
| 21 | III | 0.2 $Cu(acac)_2$ | 10 | dichloromethane | 0 |
| 22 | III | 0.2 $Ni(acac)_2$ | 10 | dichloromethane | 0 |
| 23 | IV | 0.2 $Cu(acac)_2$ | 10 | dichloromethane | 0 |
| 24 | IV | 0.2 $Ni(acac)_2$ | 10 | dichloromethane | 0 |

I 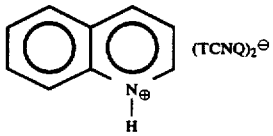

II 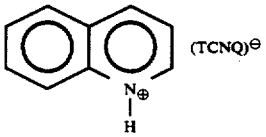

III 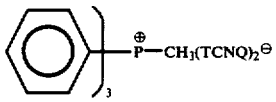

IV 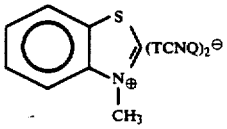

EXAMPLE 25

A suspension of 4 g CT-complex according to Example 10 in 70 g of methylene chloride is added to a solution of 30 g polyvinylacetate and 2 g nickel-ethylhexanoate in 450 g of methylene chloride and 450 g 1,2-dichloroethane.

The mixture is stirred until a homogeneous distribution is obtained.

A glass-plate is dipped into the mixture thus obtained. After evaporation of the solvent a stable, adhesive coating having a surface resistance of $10^5$ Ω/cm is obtained.

EXAMPLE 26

A commercial PVC-packaging bar for electronic construction parts is dipped into the CT-complex-containing solution according to Example 25. After evaporation of the solvent a stable, adhesive coating having a surface resistance of $7.10^6$ 106 /cm is obtained.

We claim:

1. A composition which comprises:

(a) a plastic material (b) a charge transfer complex of tetracyanoquinodimethane, and (c) an effective amount of a metal cation to stabilize the composition against the emission of HCN wherein said metal cation is *Ni (II)*Cu(II), Cu(I), Zn(II), Pd(II), Ag(I), Cd(II), Pt(II), Au(III) or Hg(II).

2. A plastics material as claimed in claim 1 wherein the anion associated with said metal cation is an acetate anion, 2-ethylhexanoate anion, stearate anion, benzoate anion, F⊖, Cl⊖, Br⊖, I⊖, $ClO_4$⊖, nitrate, sulfate, phosphate, acetyl acetonate, acetoacetate, salicylate or ethylene diamine tetracetate.

3. A plastics material as claimed in claim 1 or 2, comprising from 0.005 to 5 moles of the stabilizing metal cation per mole of said charge transfer complex.

4. Antistatic films and extrusions comprising a plastics material according to claim 1 or 2.

5. An antistatic coating on a substrate comprising a plastics material according to claim 1 or 2.

6. An antistatic foil comprising a plastics material according to claim 1 or 2.

* * * * *